United States Patent [19]

Katsuki et al.

[11] Patent Number: 4,841,738
[45] Date of Patent: Jun. 27, 1989

[54] METHOD AND APPARATUS OF AUTOMATICALLY SWITCHING BETWEEN COOLING AND HEATING MODES OF AN AIR CONDITIONER

[75] Inventors: Hikaru Katsuki, Kiryu; Katsumasa Minakawa, Ota; Masayuki Shimizu, Oizumi, all of Japan

[73] Assignee: Sanyo Electric Co., Ltd., Osaka, Japan

[21] Appl. No.: 163,847

[22] Filed: Mar. 3, 1988

[30] Foreign Application Priority Data

Mar. 5, 1987 [JP] Japan .................................. 62-50990
Mar. 5, 1987 [JP] Japan .............................. 62-32453[U]

[51] Int. Cl.⁴ ............................................. F25B 13/00
[52] U.S. Cl. ...................................... 62/160; 62/158; 236/46 R; 165/26
[58] Field of Search ................. 62/160, 159, 158, 157, 62/231; 165/26; 236/46 R, 46 F

[56] References Cited

U.S. PATENT DOCUMENTS 3,500,898  3/1970  Gerhart, Jr. et al. ................. 165/26
4,325,224  4/1982  Howland ............................... 165/26
4,635,708  1/1987  Levine ............................... 236/46 R
4,682,279  7/1987  Watabe ............................. 236/46 R

FOREIGN PATENT DOCUMENTS 59-67738  5/1984  Japan .
59-72437  5/1984  Japan .

Primary Examiner—Harry B. Tanner
Attorney, Agent, or Firm—Wenderoth, Lind & Ponack

[57] ABSTRACT

A method and an apparatus of automatically switching between cooling and heating of an air conditioner, has which is a first temperature higher than a desired room temperature, a second temperature which lower than the desired room temperature, a first temperature zone not less than the first temperature, and a second temperature zone not more than the second temperature. The method includes the steps of changing an operation mode from a cooling mode to a heating mode during the cooling mode when the room temperature after duration of a first time remains in the second temperature zone, and changing the operation mode from the heating mode to the cooling mode during the heating mode when the room temperature after duration of a second time remains in the first temperature zone.

10 Claims, 5 Drawing Sheets

METHOD AND APPARATUS OF AUTOMATICALLY SWITCHING BETWEEN COOLING AND HEATING MODES OF AN AIR CONDITIONER

BACKGROUND OF THE INVENTION

The present invention relates to a method and apparatus of automatically switching the operation mode between cooling and heating in an air conditioner with cooling and heating functions.

A conventional technique for automatic change-over between the cooling mode and the heating mode of an air conditioner was disclosed in Japanese Laid-Open Utility Model No. 59-72437 in 1984. The control of the heating/cooling operation mode switching as performed by this air conditioner involves detection of an outdoor temperature and performing a cooling operation when the measured outdoor temperature is higher than a preset temperature and a heating operation when it is lower than the setting. The mode switchover is performed periodically according to an outdoor temperature which is detected repetitively at specified intervals after the start of operation. An operation mode is determined at specified intervals so that variations in outdoor temperatures among morning, day and night times can be reflected in the automatic control of air conditioning.

In such conventional techniques as mentioned above, the cooling and heating modes are changed over according to a change in outdoor temperatures. This type of control, however, requires provision of an outdoor temperature detector. The location of the temperature detector is critical and variations in the conditions in which the temperature detector is mounted can be the cause of erroneous operation of the air conditioner. That is, the control is affected by whether the temperature detector is located in a place subjected to direct sun rays, or in the shade, or where air stagnates, making an appropriate switchover between the cooling mode and the heating mode difficult.

Since the cooling and heating operation is controlled according to the outdoor temperature, the conditions in which the occupants of the air-conditioned room require cooling or heating may not coincide with the conditions derived from the outdoor temperatures. The result is that an appropriate changeover of cooling and heating cannot be performed.

In the light of these problems, an attempt was made to control the selection of the cooling or the heating mode by the difference between an air-conditioned room temperature and a desire temperature setting, as disclosed in Japanese Laid-Open Utility Model No. 59-67738 in 1984. This attempt has a drawback in that a temporary change in the load in the air-conditioned room, which might be encountered every time that a door is opened or closed or when the number of occupants of the room changes, may result in unnecessary switchover of the operation mode of the air conditioner according to the temperature variation in the room.

. It is possible to combine the above two conventional techniques to develop a method that detects a room temperature at predetermined intervals and changes or sets the operation mode. This method, too, has a problem in that when the moment of a temporary load change coincides with the moment of the periodical temperature measurement, a similar erroneous operation may result.

SUMMARY OF THE INVENTION

An object of the present invention is to provide a method of controlling the changeover between the cooling mode and the heating mode according to an air-conditioned room temperature.

Another object of the present invention is to provide an apparatus of controlling the automatic changeover between the cooling mode and the heating mode according to an air-conditioned room temperature.

Another object of the present invention is to provide an improved method and apparatus of automatically switching between the cooling mode and the heating mode of an air-conditioner, in which masking is provided for the first or second length of time and an erroneous operation due to immediate or rapid temperature change which happens during the masking time, can be prevented and a cooling/heating mode can be switched into an optimum mode at the time the room temperature changes quite rapidly and extensively to the highest and lowest temperature zone, regardless of the masking time.

Another object of the invention is to provide an improved apparatus in which an operation mode information can be stored not only before but also after an automatic switching operation of the cooling/heating mode have stopped and an optimum operation mode can be set at the time of re-start of the operation.

According to the present invention, there is provided a method of automatically switching between cooling and heating of an air conditioner which comprises a control means for controlling cooling and heating so that a room temperature in a room becomes a desired temperature, the control means setting a first temperature which is higher than the desired temperature by a first value, and a second temperature which is lower than the desired temperature by a second value, a first temperature zone equal to or higher than the first temperature, and a second temperature zone equal to or lower than the second temperature, comprising steps of changing an operation mode from a cooling mode, in which the air conditioner operates for cooling the room when the room temperature is not less than the desired temperature, to a heating mode, in which the air conditioner operates for heating the room when the room temperature is not more than the desired temperature, during the cooling mode when the room temperature after a first time duration remains within the second temperature zone, and changing the operation mode from the heating mode to the cooling mode during the heating mode when the room temperature after a second time duration remains within the first temperature zone.

In the method of the present invention, the cooling mode and the heating mode of operation are switched over when the room temperature deviates from the temperature setting by more than a specified value and when this condition continues for a preselected length of time.

In an embodiment of the invention, the first temperature value is equal to the second temperature value. Further, the first time is equal to the second time. In the present invention, the first time or the second time commences when the room temperature reaches the first temperature or the second temperature. Alternatively, the first or the second length of time commences when the cooling or the heating is stopped.

In another embodiment of the invention, there is provided a method which has a first temperature that is higher than a desired room temperature by a first value, a second temperature that is higher than the first temperature, a third temperature that is lower than the desired room temperature by a second value, a fourth temperature that is lower than the third temperature, and temperature ranges separated by the aforementioned first, second, third and fourth temperatures into, from the highest to the lowest, a first temperature zone, a second temperature zone, a third temperature zone, fourth temperature zone and a fifth temperature zone, wherein the automatic switching method of the air conditioner comprises: switching an operation mode from the cooling mode to the heating mode during the cooling mode when the room temperature remains within the fifth temperature zone or otherwise remains within the fourth temperature zone after the duration of a first time; and switching the operation mode from the heating mode to the cooling mode during the heating mode when the room temperature is within the first temperature zone or otherwise within the second temperature zone after the duration of a second time.

In the above described embodiment, the first or the second length of time can commence when the room temperature reaches the first or the fourth temperature zone. Alternatively, the first or the second length of time can commence when the cooling or the heating is stopped.

According to the present invention, there is provided an apparatus for automatically switching between a cooling mode and a heating mode of an air conditioner to provide a desired room temperature comprising a first means for automatically switching an operation mode between the cooling mode and the heating mode according to the room temperature and the desired temperature and storing the data of the operation mode, a second means for selecting one of the automatic switching modes which drives the first means, a cooling mode for a cooling operation, and a heating mode for a heating operation, a detecting means for detecting the cooling-heating modes temperature and the room temperature, and operation controlling means for receiving an output from the detecting means and for controlling cooling or heating, a time switch means for starting timing at the time that the cooling/heating operation is stopped by an OFF signal from said detecting means or by a stop switch and for supplying an output signal after a predetermined time period, and a cancelling means for cancelling a mode which is stored in the first means.

PREFERRED EMBODIMENT OF THE INVENTION

Figure 2:
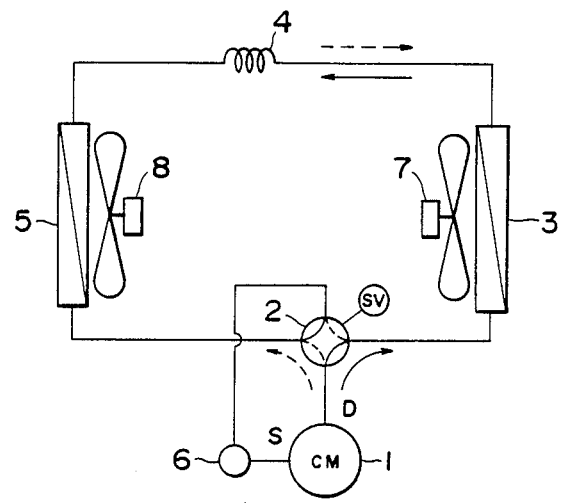
FIG. 2 is a schematic diagram of the air conditioner using the control device of FIG. 1.

With reference first to FIG. 2, an air conditioner according to the present invention has a compressor 1, a four-way valve 2, an outdoor heat exchange unit 3, a capillary tube 4, an indoor heat exchange unit 5, and an accumulator 6.

These components are connected in a closed loop circuit by a refrigerant piping to form a refrigeration cycle. When the 4-way valve 2 is in a position shown by a solid line, the refrigerant delivered by the compressor 1 flows in the direction of a solid-line arrow and is condensed by the outdoor heat exchange unit 3 and evaporated by the indoor heat exchange unit 5 to cool the air in the room. When the 4-way valve 2 is in a position shown by a dotted line, the refrigerant delivered by the compressor 1 flows in the direction of a dotted-line arrow and is condensed by the indoor heat exchange unit 5 and evaporated by the outdoor heat exchange unit 3 to heat the room.

An outdoor fan 7 and indoor fan 8 are provided to supply air to the outdoor heat exchange unit 3, and the indoor heat exchange unit 5, respectively.

Figure 1:
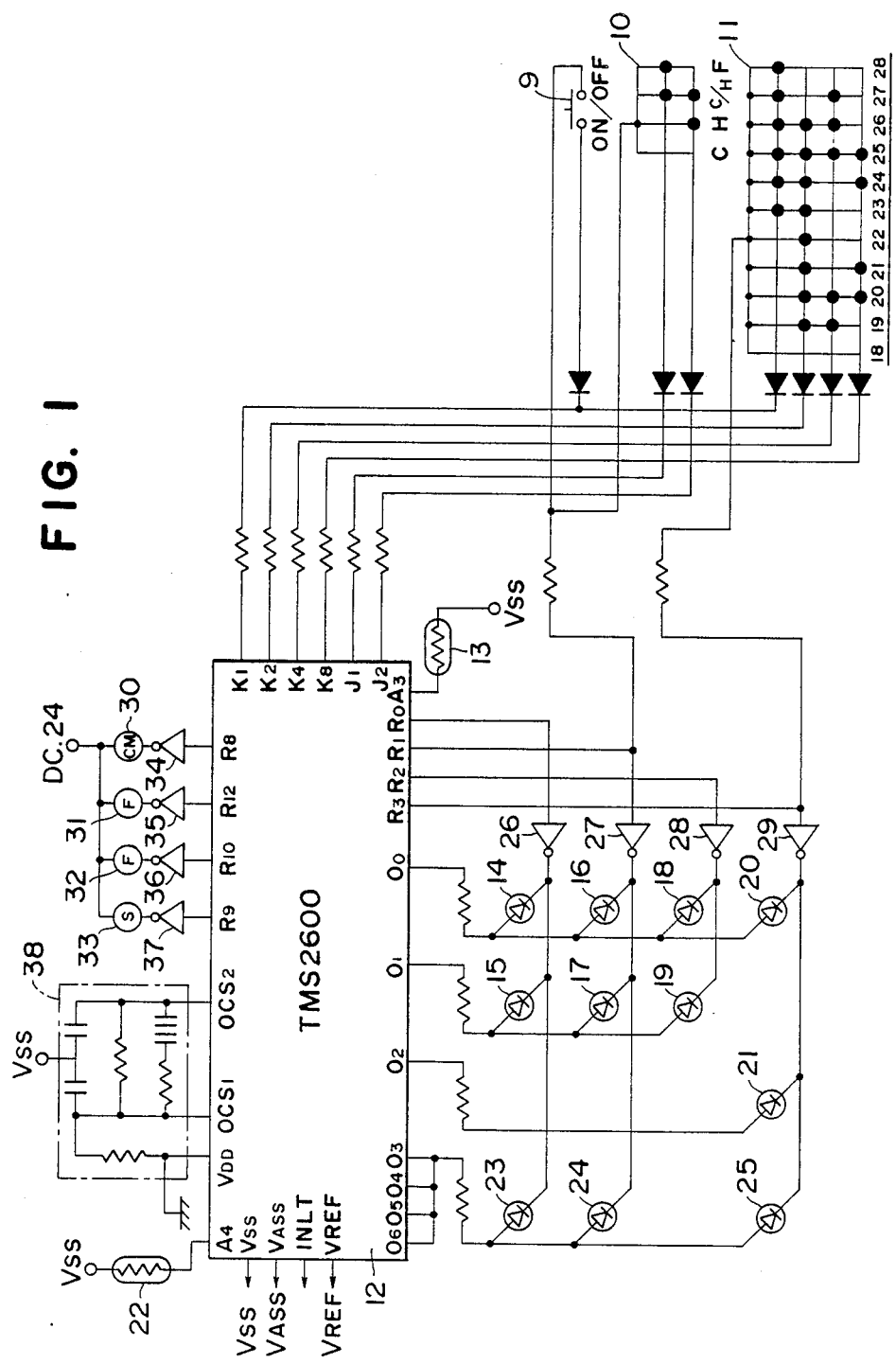
FIG. 1 is an electrical circuit of the control device to which the embodiment of this invention is applied.

FIG. 1 shows the essential part of a control circuit used for the refrigeration cycle of FIG. 2. A pushbutton switch 9 produces a signal for switching the air conditioner on and off each time it is depressed. A select switch 10 is provided for selecting a cooling mode C, a heating mode H, an automatic cooling/heating switching mode C/H, and a fan mode F. The select switch 10 uses a Gray code output switch. A room temperature setter 11 is provided for setting a desired temperature. The setter 11 consists of Gray code output switches with each code corresponding to the setting temperatures from 18 to 28 degrees Celcius as illustrated.

A microprocessor (microcomputer) 12 employs, for instance, a TMS2600 of Texas Instruments, Inc. containing a program that performs a sequence of processings according to the diagram described presently. The setting states of the switch 9, the select switch 10 and the room temperature setter 11 are stored at particular locations in memory of the microprocessor 12 by scanning at its input port K1, K2, K4, K8, J1 and J2 the signals output from its output ports R1 and R3.

A temperature detector 13 with an internal resistance which varies according to temperature is located at a position where the temperature of the air-conditioned room can be detected. The temperature detector 13 is connected at one end to the input port A3 (analog input terminal) of the microprocessor 12 and at the other end to a constant voltage power supply $V_{SS}$. The microprocessor 12 receives an electric current whose magnitude corresponds to a room temperature through the input port A3 at each cycle of the program, performs the analog/digital (A/D) conversion on the data that corresponds to the current value, and stores the digital data in the memory device. The temperature data is acquired by the microprocessor 12 more than once and the average of the data is stored in memory as a room temperature according to which temperature control is performed.

Reference numerals 14 through 20 depict light emitting diodes for indicating room temperatures which are put in positions corresponding to temperatures of 15° C., 17° C., 19° C., 21° C., 23° C., 25° C. and 27° C. A light emitting diode corresponding to a temperature closest to the temperature value of the air-conditioned room is illuminated.

A light emitting diode 21 for indicating "cool wind prevention" is lit when the temperature of the indoor heat exchanger unit 5 shown in FIG. 1 is below a specified value during the heating operation. The temperature of the indoor heat exchanger unit 5 is entered from a temperature detector 22 into the microprocessor 12 through the input port A4 in a manner similar to that employed in entering the room temperature to the microprocessor 12.

Light emitting diodes 23, 24 and 25 indicate the "automatic cooling/heating switching mode", "cooling mode" and "heating mode", respectively and are arranged close to these mode indication markings. These light emitting diodes 23, 24, 25 are turned on according to the setting value of the select switch 10.

The light emitting diodes 14 to 21 and 23 to 25 are dynamically turned on and off by the microprocessor 12 using its output ports $R_0$ to $R_3$ and the display ports $O_0$ to $O_6$. Denoted 26 to 29 are inverter circuits.

Relays 30–33 control the on-off operation of the compressor 1, indoor fan 8, outdoor fan 7 and 4-way valve 2, respectively, shown in FIG. 2. These relays 30 to 33 are connected at one end to the output ports $R_8$, $R_{12}$, $R_{10}$, $R_9$ of the microprocessor 12 through inverters 34 to 37, respectively, and at the other end to the constant voltage circuit of DC 24(V).

In FIG. 1 of the drawing, an oscillating circuit 38 consists of a quartz oscillator, a resistor and a capacitor, and supplies a reference clock to the microprocessor 12 at the input ports OCS1 and OCS2.

The constant voltage circuit for producing the constant voltage $V_{SS}$, DC24V, $V_{ASS}$ and $V_{REF}$ can use an ordinary power supply circuit and no explanation is given. The $V_{ASS}$ and $V_{REF}$ are upper and lower limit voltages, respectively, for the A/D conversion by the microprocessor 12. The terminal INLT is a power reset terminal which receives a signal for resetting the microprocessor 12 when power is supplied. This signal need only be produced when the output of the power supply circuit exceeds a specified voltage at times of startup.

Figure 3:
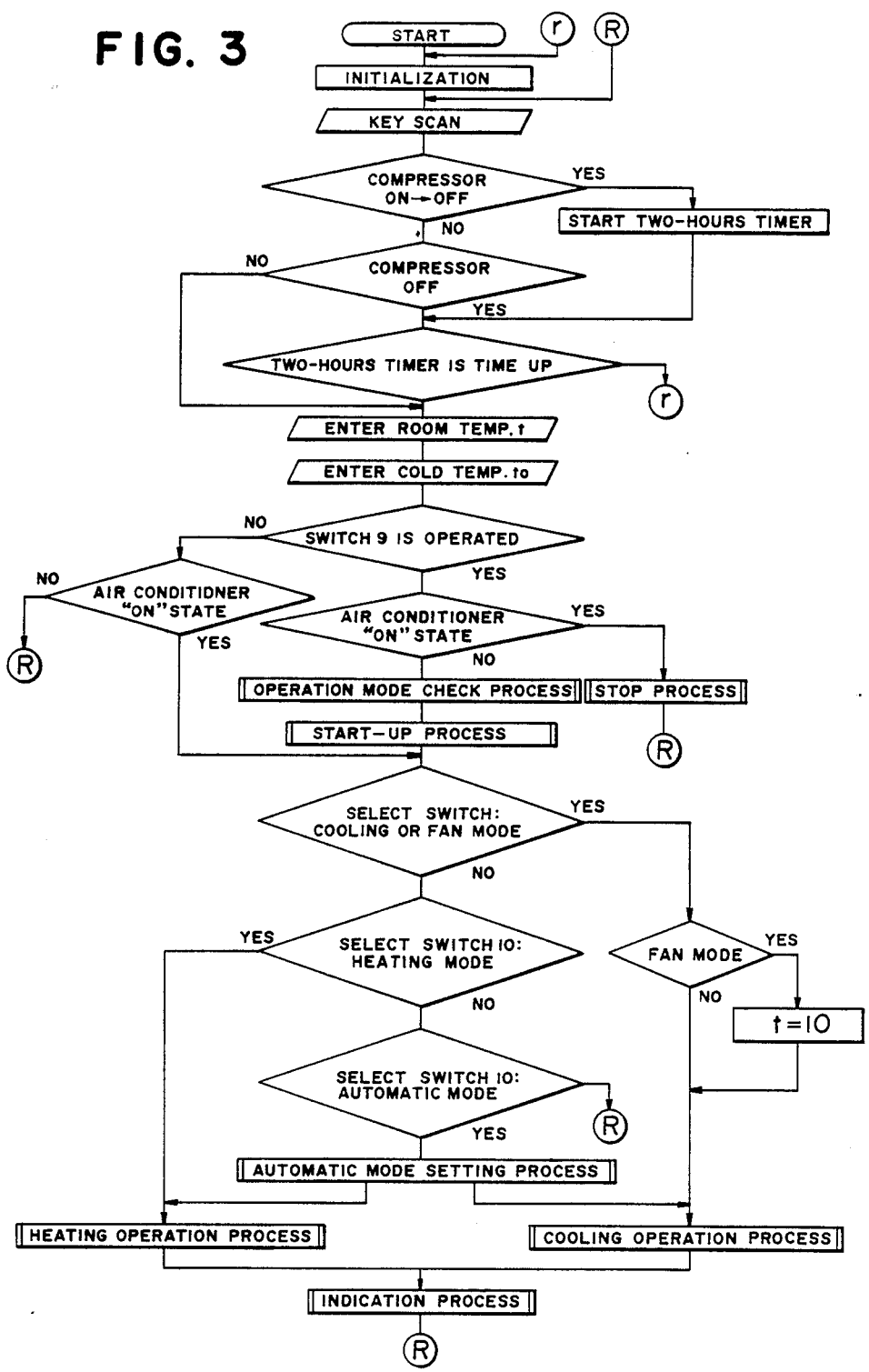
FIGS. 3 through 5 are flowcharts showing the operation of essential parts of the microprocessor of FIG. 1.

FIG. 3 shows the essential part of a flow chart for the microprocessor 12 that performs the above-mentioned processing. Referring to FIG. 3, the setting states of the switch 9, the select switch 10 and the room temperature setter 11 are entered by key scanning. Then the operating condition of the compressor 1 is checked. Clocking is started when the compressor 1 changes from ON state to OFF state and is continued while the compressor 1 remains in OFF state. When the clocking time amounts to two hours, the microprocessor is initialized again to erase the cooling mode or the heating mode stored in memory. When within two hours of clocking the compressor 1 is started again, the clocking is initiated at the moment the compressor 1 is next stopped. Then, the temperature t in the air-conditioned room and the coil temperature $t_0$ (temperature of the indoor heat exchanger unit 5) are entered.

Figure 4:
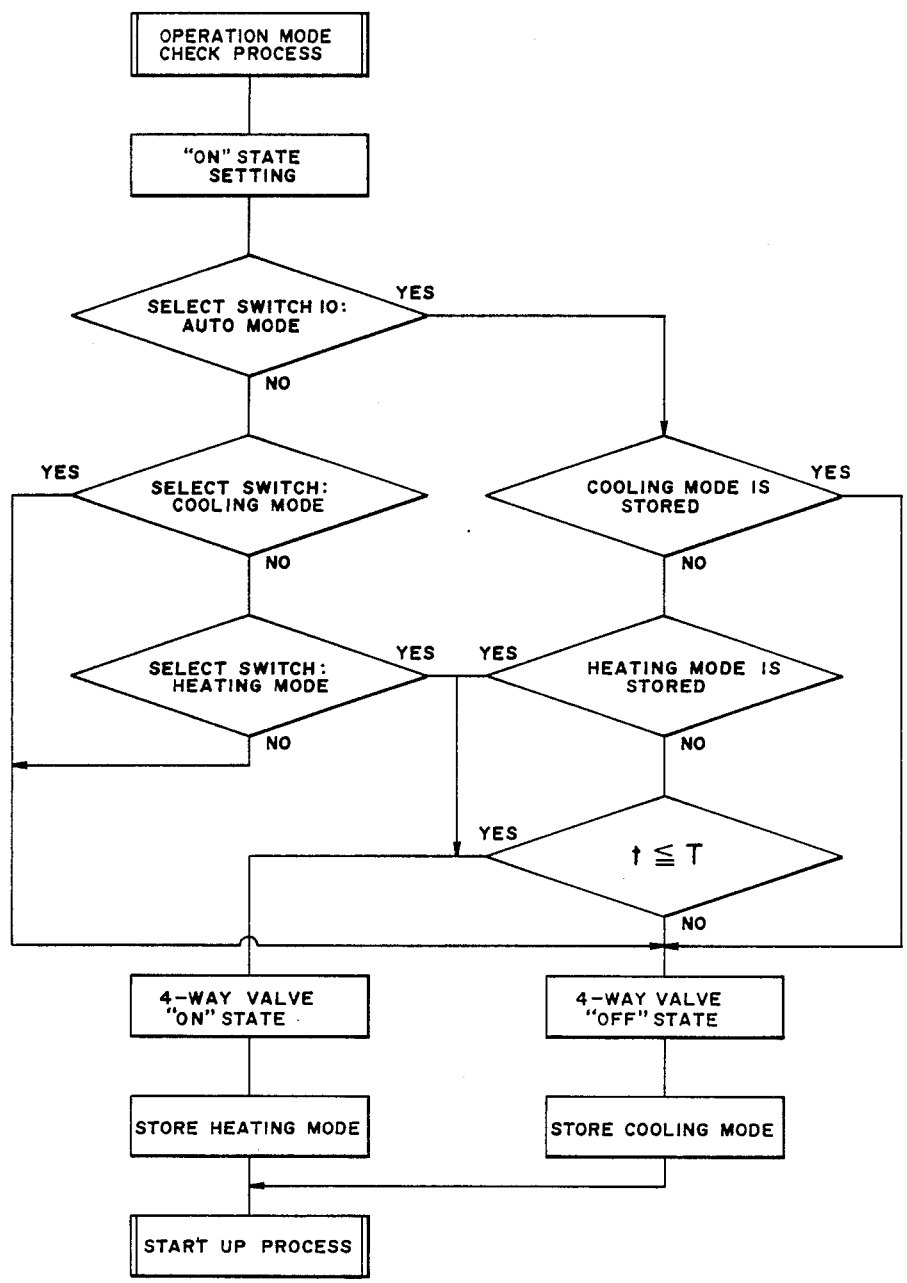

When the above scanning detects a depression of the switch 9, the air conditioner's start/stop is switched over. The start-up is initiated after the "operation mode check" as shown in FIG. 4 is made. The "operation mode check" sets the cooling or heating mode of the air conditioner at time of start-up. This check is carried out as follows. First, the state of the air conditioner is changed from OFF state to ON state. Then, it is checked which mode the select switch 10 (FIG. 1) is in.

If the switch 10 is in the automatic mode, the microprocessor 12 checks whether the cooling or heating mode is stored in memory. If stored, the stored mode is followed. That is, when the start-up demand is made before the reinitialization of the microprocessor, the preceding operation mode is retained. When the start-up is triggered after the reinitialization and there is no operation mode stored in the memory, either the cooling or the heating mode is set depending on the relationship between the temperature T set by the room temperature setter 11 and the actual room temperature t.

After the air conditioner has started operation, a check is made again of the mode of the select switch and operation is performed according to the mode of the switch. If during the cooling operation the room temperature t is at t=10 (a minimum room temperature detectable; if a temperature below 10° C. is detected, the room temperature will be assumed as t=10), no cooling operation in which the compressor 1 is driven is performed and only a fan operation is done because the minimum setting value of the room temperature setter 11 is 18° C. In the heating operation, a defrost operation is performed by detecting a change in the temperature $t_0$ of the indoor heat exchanger unit 5.

Figure 5:
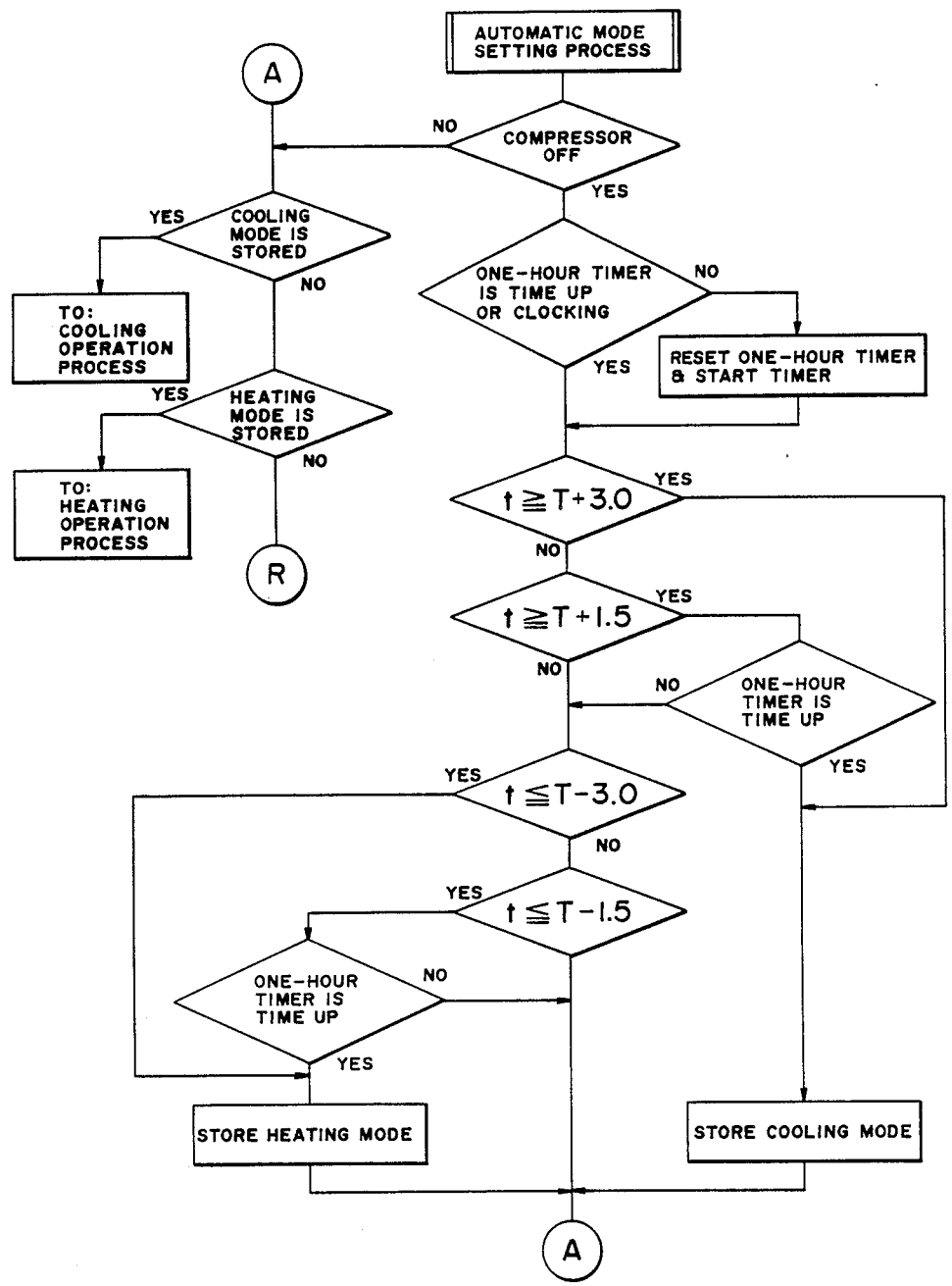

FIG. 5 is a flow chart showing the sequence of "automatic mode setting" operation. When the compressor 1 is running, the cooling or heating operation is continued. When the compressor 1 stops (in OFF state), the timer is started. Next, when the room temperature t is equal to or higher than the setting value T plus 3.0, i.e., $t \geq T+3.0$, the cooling mode is set regardless of the present operation mode. Also when $t \geq T+1.5$ and when the timer's time runs out, the cooling mode is set. In the case of $t \leq T-3.0$, the heating mode is set regardless of the present operation mode. Also when $t \geq T-1.5$ and when the timer's time runs out the heating mode is set. The timer is reset and started when the compressor 1 is changed from ON state to OFF state. The clocking time of this timer is set to about one hour. A similar sequence is also effected if the timer is started when the temperature t becomes $t \geq T+1.5$ or $t \leq T-1.5$.

Figure 6:
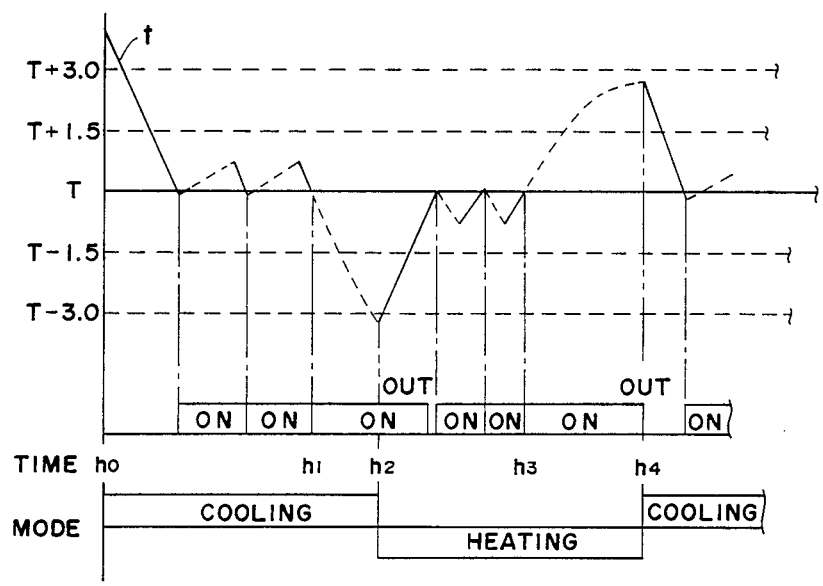
FIG. 6 is an explanatory drawing showing the cooling/heating mode switching operation of the control device of FIG. 1.

With reference to FIG. 6, an operation of the switchover between the cooling and the heating mode with the select switch 10 set to the automatic mode is explained. At time $h_0$ the switch 9 is depressed to start operation. The temperature at this time is higher than the set temperature T, so that the cooling operation is performed. During the period from $h_0$ to $h_1$, a thermostatic cycle operation is carried out in which the room temperature t and the set temperature T are compared. A short time after $h_1$, if the room temperature t drops to $t \leq T-3.0$, which may be caused by a fall in the outdoor temperature, the operation mode changes to the heating mode, starting the heating operation. Until the time $h_3$, the thermostatic cycle operation for heating is performed as similar as in the cooling operation. After time $h_3$, the thermostatic cycle operation for room temperature t satisfies the condition $t \geq T+1.5$ and becomes stable. When the timer's time is out at $h_4$, the operation mode changes from the heating mode to the cooling mode, resuming the cooling operation. In this way, since the operation mode change is performed when the room temperature t has remained in the range of $|t-T| \geq 1.5$ for more than a specified period of time or when the temperature t is in the range of $|t-T| \geq 3.0$, an instantaneous temperature variation is masked by the timer to prevent an erroneous change of operation mode. When the magnitude of temperature variation is large, the operation mode change is performed irrespective of the timer masking operation.

The cooling or heating mode is maintained for a specified period of time after the compressor 1 has stopped operating, so that when the air conditioner or the compressor is stopped and then restarted by the switch 9 or the select switch 10, the preceding mode is used.

Furthermore, in this embodiment the first temperature value and the second temperature value are set equal to each other, i.e., set to 1.5 degrees. Also the first length of time and the second length of time are set equal, i.e., set to about one hour. The use of the same values for these settings simplifies the program of the microprocessor, which in turn allows additional use of other control programs thus improving the control performance of the air conditioner as a whole.

The method of automatically switching the operation mode of an air conditioner with the cooling and heating functions in one embodiment of the invention has a desired setting temperature, a first temperature zone higher than the temperature setting, a second temperature zone lower than the setting temperature, a first specified time period and a second specified time period. In the cooling mode, when the room temperature is within the second temperature zone after being masked for the first specified time period, the operation mode is changed from the cooling mode to the heating mode. In the heating mode, when the room temperature is within the first temperature zone after being masked for the second specified time period, the operation mode is changed from the heating mode to the cooling mode. Since the operation mode is switched over between cooling and heating after the masking is performed for the first or the second specified period of time, it is possible to prevent undesired operation mode changes caused by instantaneous temperature variations which occur during the masking times.

In the second embodiment of the invention, the method has a first temperature that is higher than a desired room temperature by a first value, a second temperature that is higher than the first temperature, a third temperature that is lower than the desired room temperature by a second value, temperature ranges divided by the aforementioned first, second, third and fourth temperatures comprising, from the highest to the lowest, a first temperature zone, a second temperature zone, a third temperature zone, a fourth temperature zone and a fifth temperature zone. The automatic operation mode switching method of an air conditioner comprises the steps of switching the operation mode from the cooling mode to the heating mode during the cooling mode when the temperature in an air-conditioned room is within the fifth temperature zone or is otherwise within the fourth temperature zone after a first length of time, and switching the operation mode from the heating mode to the cooling mode during the heating mode when the temperature in an air-conditioned room is within the first temperature zone or is otherwise within the second temperature zone after a second length of time.

According to the second embodiment of the invention, masking is provided for the first or second length of time and an erroneous operation due to an immediate or rapid temperature change which happens during the masking time, can be prevented and a cooling/heating mode can be switched into an optimum mode at the time the room temperature changes quite rapidly and extensively to the first or fifth temperature zone, regardless of the masking time.

According to the apparatus of the present invention, the operation mode data can be stored not only before but also after an automatic switching operation of the cooling/heating mode is stopped and an optimum operation mode can be set at the time of re-start of the operation.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention will not be limited to the particular embodiment illustrated by the drawings and described in the specification as the best mode presently contemplated for carrying out this invention, but that the invention will include any embodiments falling within the description of the appended claims.

What is claimed is:

1. A method of automatically switching between a cooling mode and a heating mode of an air conditioner;
    wherein said air conditioner comprises a control means for controlling said cooling mode to cool a room when a room temperature of said room is not lower than a desired temperature and for controlling said heating mode to heat said room when said room temperature is not higher than said desired temperature;
    wherein said control means sets temperature A so that said temperature A is higher than said desired temperature by a first value, and sets temperature B so that said temperature B is lower than said desired temperature by a second value, and wherein said control means defines a first temperature range not lower than said temperature A and defines a second temperature range not higher than said temperature B;
    comprising the steps of:
    changing from said cooling mode to said heating mode when said room temperature remains within said second temperature range after a first duration of time, said first duration of time commencing at a time when said room temperature reaches said temperature A during said cooling mode;
    changing from said heating mode to said cooling mode when said room temperature remains within said first temperature range after a second duration of time, said second duration of time commencing at a time when said room temperature reaches said temperature B during said heating mode.

2. A method according to claim 1, wherein said first value is made equal to said second value.

3. A method according to claim 1, wherein said first duration of time is made equal to said second duration of time.

4. A method of automatically switching between a cooling mode and a heating mode of an air conditioner;
    wherein said air conditioner comprises a control means for controlling said cooling mode to cool a room when a room temperature of said room is not lower than a desired temperature and for controlling said heating mode for heating said room when said room temperature is not higher than said desired temperature;

wherein said control means sets a temperature A so that said temperature A is higher than said desired temperature by a first value, and sets temperature B so that said temperature B is lower than said desired temperature by a second value and defines a first temperature range not lower than said temperature A and defines a second temperature not higher than said temperature B;

comprising the steps of:

changing from said cooling mode to said heating mode when said room temperature remains within said second temperature range after a first duration of time, said first duration of time commencing at a time when cooling is stopped during said cooling mode;

changing from said heating mode to said cooling mode when said room temperature remains within said first temperature range after a second duration of time, said second duration of time commencing at a time when said heating is stopped during said heating mode.

5. A method according to claim 4, wherein said first value is made equal to said second value.

6. A method according to claim 4, wherein said first duration of time is made equal to said second duration of time.

7. A method of automatically switching between a cooling mode and a heating mode of an air conditioner:

wherein said air conditioner comprises a control means for controlling said cooling mode to cool a room when a room temperature of said room is not lower than a desired temperature for controlling said heating mode for heating said room when said room temperature is not higher than said desired temperature;

wherein said control means sets temperature A so that said temperature A is higher than said desired temperature by a first value, and sets temperature B so that said temperature B is higher than said temperature A by a second value, and sets temperature C so that said temperature C is lower than said desired temperature by a third value, and sets temperature D so that said temperature D is lower than said desired temperature by a fourth value, and wherein said control means has five temperature ranges comprising, from higher temperature to lower temperature, a first temperature range, a second temperature range, a third temperature range, a fourth temperature range, and a fifth temperature range;

said five temperature ranges being defined by temperatures A, B, C, and D, comprising the steps of:

changing from said cooling mode to said heating mode when said room temperature remains within said fifth temperature range, or otherwise remains within said fourth temperature range after a first duration of time during said cooling mode, and changing from said heating mode to said cooling mode when said room temperature remains within said first temperature range or otherwise remains within said second temperature range after a second duration of time during said heating mode.

8. A method according to claim 7, wherein said first duration of time commences when said room temperature reaches said temperature A, and said second duration of time commences when said room temperature reaches said temperature C.

9. A method according to claim 7, wherein said first duration of time commences when cooling is stopped and said second duration of time commences when heating is stopped.

10. An apparatus having a cooling mode for a cooling operation, a heating mode for a heating operation and an automatic switching mode for automatically switching between the cooling mode and the heating mode to thereby provide a desired room temperature, comprising:

a first operation means for storing data of one of a cooling signal for said cooling operation and a heating signal for said heating operation in a memory device on the basis of a difference between a room temperature and a room temperature setting value at a starting time of the operation in accordance with said automatic switching mode;

a second operation means for automatically switching said data stored in said memory device to one of said cooling signal and said heating signal in accordance with said room temperature and said room temperature setting value;

an operation controlling means for controlling cooling and heating in accordance with said cooling signal and said heating signal, and a time switch means for starting timing at a time when said automatic switching is switched to one of said cooling mode and said heating mode, or when said apparatus is stopped, and a masking means for retaining the signal stored in said memory device during the time that said time switch means is timing.

* * * * *